United States Patent [19]

Crosbie

[11] Patent Number: 4,582,696

[45] Date of Patent: Apr. 15, 1986

[54] METHOD OF MAKING A SPECIAL PURITY SILICON NITRIDE POWDER

[75] Inventor: Gary M. Crosbie, Dearborn, Mich.

[73] Assignee: Ford Motor Company, Dearborn, Mich.

[21] Appl. No.: 723,605

[22] Filed: Apr. 15, 1985

[51] Int. Cl.⁴ ............................................. C01B 21/068
[52] U.S. Cl. ...................................................... 423/344
[58] Field of Search ........................................ 423/344

[56] References Cited

U.S. PATENT DOCUMENTS

| | | | |
|---|---|---|---|
| 3,855,395 | 12/1974 | Cutler | 423/344 |
| 4,117,095 | 9/1978 | Komeya | 423/344 |
| 4,264,565 | 4/1981 | Inoue | 423/344 |
| 4,346,068 | 8/1982 | Kasai | 423/344 |
| 4,387,079 | 6/1983 | Kasai | 423/344 |
| 4,530,825 | 7/1985 | Johansson | 423/344 |
| 4,543,344 | 9/1985 | Cannady | 423/344 |
| 4,552,740 | 11/1985 | Morgan | 423/344 |

OTHER PUBLICATIONS

Zhang & Cannon, "Preparation of Silicon Nitride from Silica," American Ceramic Society, pp. 691–695 (1982).

*Primary Examiner*—Peter D. Rosenberg
*Attorney, Agent, or Firm*—William E. Johnson; Clifford L. Sadler

[57] ABSTRACT

This specification teaches a method of making a special purity alpha silicon nitride powder which is free from halogen-containing and metal-containing compounds as trace constituents. The method has the following steps. Tetraethyl orthosilicate (TEOS) is prepared of requisite purity. A fine mist of the TEOS solution is delivered to a heated reaction zone. Ammonia is contacted with the fine mist of TEOS in the reaction zone. A reaction product of this reaction is collected, the reaction product being amorphous silica and carbon black. The reaction product is heated to a temperature in a range of 1300°–1500° C. The heated reaction product is subjected to a nitrogen gas treatment to convert the silica of the reaction product into a special purity alpha silicon nitride powder because of the chemical reactions occurring between the silica, carbon black, and nitrogen. The prepared alpha silicon nitride powder is then recovered.

4 Claims, No Drawings

METHOD OF MAKING A SPECIAL PURITY SILICON NITRIDE POWDER

TECHNICAL FIELD

This application is directed to a method of making a high purity alpha silicon nitride powder. The method is one which produces an equi-axed alpha silicon nitride powder which is especially free from halogen-containing and metal-containing compounds as trace constituents.

BACKGROUND AND PRIOR ART STATEMENT

None of the presently available silicon nitride powders known to me can meet the special chemical purity requirements believed to be necessary for intermediate temperature strength and oxidation resistance while simultaneously meeting microstructural requirements for fabrication into complex shapes. Such characteristics from silicon nitride powders are needed and vital for heat engine performance of sintered silicon nitride and its alloys. I am disclosing in this specification an innovative powder-making process which achieves these ends by being of high chemical purity with respect to certain classes of elements known to be deleterious in sintered silicon nitride ceramics.

Advancement in the area of high temperature mechanical properties for articles made from silicon nitride powder is linked to reduction in the amount of impurities found at the grain boundaries and a reduction of concentration of fluxing impurities in that grain boundary phase. Indeed, the ratios of impurities in the grain boundary and oxide second phases determine not only the eutectic and glass transition temperature but play a key role in oxidation and crystallization of second phases for high temperature mechanical properties. Quantitative studies of oxidation have shown that there is less nitrogen released than oxygen taken up on a stoichiometric basis for certain tested samples of articles made from silicon nitride. This inconsistency points to alkali and alkaline earth impurities being oxidized rather than only the silicon nitride. Intermediate temperature oxidation resistance, in the vicinity of 1000° C., is a major present need for articles manufactured from silicon nitride powders. Chlorine residue appears to interfere with the controlled crystallization of second phases after densification. Because there is so little second phase in such articles, and even less is desired, a much higher purity of silicon nitride powder with respect to these elements is needed than presently available to obtain a modest improvement in the intergranular phase purity. Higher purity with respect to these elements in the silicon nitride powder of desired physical characteristics is essential for advancing the state of the art of grain boundary engineering.

The prior art for synthesis of silicon nitride powders that I am aware of includes several categories, as indicated by the raw material that is the source of the element silicon.

In the well known case for which silicon nitride is derived from nitriding of silicon metal, alkaline earth metal impurities (such as calcium) and transition metal impurities (such as iron) are typically present in the product silicon nitride in quantities that are detrimental to the properties of sintered silicon nitride. Indeed, iron impurity is intentionally added as an aid to the nitriding. Due to the solid particulate nature of the silicon raw material, reduction of impurities (as by leaching) is of limited effectiveness, and the physical characteristics of the starting material are subject to many prior processing variables. The silicon nitride so formed typically has 10% or greater of the beta phase present, which phase is detrimental to the subsequent growth of interlocking, non-equi-axed grains in the ceramic sintering process.

Reaction of high purity silicon-containing gases, such as $SiH_4$, with ammonia have been used to produce silicon nitride. These processes produce an ultrafine crystallite size (0.03 micrometer and finer) which is not well suited for ceramic forming and suffer excessive shrinkage upon sintering.

Liquid silicon chloride compounds as a raw material have been used in the preparation of silicon nitride. Silicon nitride of high purity with respect to metal-containing compounds, such as calcium and iron, can be synthesized from silicon tetrachloride. However, any chlorine residues from the raw material which remain in the silicon nitride powder are detrimental to grain boundary phase development in a sintered ceramic made therefrom.

The prior art of processes of carbothermal nitriding type that I am aware of includes an article entitled "Preparation of Silicon Nitride From Silica", Chang et al, J. Am. Ceram. Soc., 67 (10), 691–695, 1984. This paper describes the nucleation and growth of silicon nitride from a carbon/silicon dioxide mixture in an nitrogen atmosphere at 1400° C. The study conducted was one in which the specific surface area, particle size, and distribution of silicon dioxide and carbon was varied. The authors noted that yield increased and particle size decreased with increasing silicon dioxide and carbon specific surface area. In this particular paper, the authors discuss the decomposition of tetraethyl orthosilicate (TEOS) by contact with water and utilize the conventional practice of mechanically mixing in carbon black powder produced by commercial suppliers. Of course, the carbon black powder could contain any sort of impurity because it is a powder and is dependent upon the process and the producer who define exactly what is contained therein. The variable physical structure of carbon black and the variable mixing process limit the consistency of the product.

In a similar vein, others have mixed carbon powders with silica (which are products of reaction of TEOS and silicon chloride compounds) and treated the resulting mixture under nitrogen to form silicon nitride. As reported in Chemical Abstracts Nos. 92:200365j and 92:134028y, these citations are to Jpn. Kokai Tokyo Koho Nos. 79,138,898 and 79,138,899, both by Hiroshi Endo et al.

In another carbothermal nitriding process, U.S. Pat. No. 3,855,395 is directed to the production of silicon nitride from rice hulls. The patent discloses the production of silicon nitride from rice hulls where rice hulls are reacted with nitrogen at an elevated temperature either singly or in combination with a catalyst of iron. The rice hulls, by virtue of their biological source, are heavily laden with cation impurities which will affect the purity and quality of the silicon nitride powder made therefrom and the grain boundary phases in sintered silicon nitride which are fabricated therefrom.

U.S. Pat. No. 4,117,095 also discloses a method of making alpha type silicon nitride powder. The alpha silicon nitride powder disclosed is prepared by heating a powdered mixture of silica, carbon, and metallic silicon in a nitrogen-containing atmosphere and then subjecting the material to a heat treatment in an oxidizing atmosphere for decarbonization of that material.

The process of my invention is one which produces an alpha silicon nitride powder from a single liquid precursor for silicon and carbon. A consistent product is produced because of the consistent input materials and consistent process controls. The process is carried out by a high temperature synthesis of an alpha silicon nitride obtained from the reaction of an optionally seeded organometallic precursor, TEOS, with ammonia and an optional hydrocarbon gas or oxidant.

The consistency of the raw material input follows from the use of a liquid feed material, TEOS, that is substantially free, in ordinary form, of chlorine, any other halogen and metals. Chlorine and other halogens have adverse consequences in heat engine applications of silicon nitride ceramics being produced therefrom. Impurities such as halogens can be efficiently removed from liquids to the extent desired because of the many types of processing available for purification of liquids that are not available for particulate raw materials.

DISCLOSURE OF INVENTION

This invention is directed to a method of making a special purity silicon nitride powder and, more particularly, to a method of making a special purity, alpha phase silicon nitride compound which is free from halogen-containing and metal-containing compounds as trace elements as related to precursor purity. In accordance with the teachings of the method of my invention, an alpha silicon nitride powder which is substantially free from halogen-containing and metal-containing compounds as trace elements is prepared in the following manner. A liquid, tetraethyl orthosilicate (TEOS) is prepared. A fine mist of the TEOS is delivered to a heated reaction zone. Ammonia ($NH_3$) is in contact with the fine pyrolysis products from the mist of TEOS in the heated reaction zone. A reaction product is collected, the reaction product being amorphous silica and carbon black. Without any additions of iron catalysts, the reaction product is heated to a temperature in a range of 1300°-1500° C. The heated reaction product is subjected to a nitrogen gas treatment to convert the silica of the reaction product into alpha silicon nitride powder because of the chemical reactions occurring between the silica, carbon black and nitrogen. The special purity alpha silicon nitride powder is recovered. As known in the carbothermal nitriding art, a heat treatment in an oxidizing atmosphere may be additionally used to eliminate residual carbon.

If desired, ultrafine silicon particles (as produced by decomposition of $SiH_4$ of high purity) may be dispersed in the TEOS to act as a decomposition surface for production of the amorphous silica and as a seed for subsequent growth of silicon nitride. The preferred way of subjecting the heated reaction product to a nitrogen gas treatment is to have a flowing nitrogen gas move over the reaction product for a period of time sufficient to convert substantially all of the silica in the reaction product to alpha silicon nitride powder.

BEST MODE AND INDUSTRIAL APPLICABILITY

The novel features that are considered characteristic of the invention are set forth with particularity in the appended claims. The invention itself, however, both as to its organization and its method of operation, together with additional objects and advantages thereof, will best be understood from the following description of specific examples.

The following description is what I now consider to be the preferred embodiment of the method of making a special purity alpha silicon nitride powder in accordance with the teachings of my inventive concept. The following description also sets forth what I now contemplate to be the best mode of carrying out my invention as is embodied in the examples which show the production of special purity alpha silicon nitride powder. This description is not intended, however, to be a limited upon the broader principles of the method of my invention.

EXAMPLE 1

This example discloses a preferred embodiment of the novel process of my invention for preparation of alpha silicon nitride from TEOS.

A seed of ultrafine (approximately 20 nm crystallite) silicon was dispersed in TEOS by use of an immersed ultrasonic horn agitation device. The amount of seed was 0.09 g. The amount of TEOS was 98 mL. The coarser fraction of the seed sedimented in 30 minutes prior to use. Impurities in the TEOS were 7 ppmw Cl, 3.6 ppmw Fe, 3 ppmw Ca, and 1.2 ppmw Mg.

The TEOS/seed mixture was pumped from an air-free enclosure to the sealed entry of an electrically heated tubular reactor. The pump tubulation material was polyvinyl chloride polymer. The pumping type was peristaltic. The TEOS/seed flow rate was 1.0 mL/minute. In view of the low flow rate (in this lab scale realization), atomization was achieved by an ultrasonically vibrating flange (o.d. 1.0 cm) at the end of the liquid entry tube.

The droplets so dispersed were swept into a heated reaction zone (nominally, 100 cm hot zone length) by a coaxial flow of anhydrous $NH_3$. The $NH_3$ flow rate was 320 mL/minute. The reactor tube i.d. was 4.1 cm. The furnace setpoint was 1450° C. and furnace temperature was steady. The run was carried out for 55 minutes.

A powder (intermediate reaction product) was collected on a sieve at the exit of the reactor. A mixture of amorphous silica and carbon black was determined to be the result on the basis of infrared spectrophotometryand absence of distinct lines in the x-ray diffraction pattern.

The intermediate product powder was heated to 1460° C. in a stream of dry nitrogen for five hours. The formation of alpha-$Si_3N_4$ was confirmed by x-ray diffraction. In particular, a match-up of 20 lines to the diffraction pattern of an alpha $Si_3N_4$ reference was made. A relatively equi-axed, near-micron sized particle morphology was confirmed by scanning electron microscopy.

EXAMPLE 2

In this example a preferred embodiment of the novel process is described for the preparation of alpha-$Si_3N_4$ from TEOS. This example differs from Example 1 in that no seed is used.

TEOS was pumped at a rate of 1.0 mL/min from an air-free enclosure to the entry of an electrically heated tubular reactor and atomized as in Example 1. The droplets so dispersed were swept into a heated reaction zone by a coaxial flow of $NH_3$. The $NH_3$ flow rate was 320 mL/minute. The furnace setpoint was 1450° C. and furnace temperature was steady. The run was carried out for 64.5 minutes.

A powder (intermediate reaction product) was collected on a sieve at the exit of the reactor. A mixture of amorphous silica and carbon black was determined to be the result on the basis of infrared spectrophotometry and absence of distinct lines in the x-ray diffraction pattern. The mass ratio of $SiO_2$ to carbon was 1.56:1 as determined by ignition loss and by calculations from carbon lost as byproduct gases, principally HCN and CO.

The intermediate reaction powder was heated to 1460° C. in a stream of dry nitrogen for five hours. The formation of alpha-$Si_3N_4$ was confirmed by x-ray diffraction comparison of eight peaks. A relatively equi-axed, near-micron sized particle morphology was confirmed by scanning electron microscopy.

This example demonstrates that the use of seed is not necessary for the production of alpha/silicon nitride by pyrolysis of TEOS.

EXAMPLE 3

In this example a preferred embodiment of the novel process is described for the preparation of alpha/$Si_3N_4$ from TEOS. This example differs from Examples 1 and 2 in that a higher temperature was used for the pyrolysis.

TEOS was pumped from an air-free enclosure to the entry of an electrically heated tubular reactor and atomized as in Example 1. The droplets so dispersed were swept into a heated reaction zone by a coaxial flow of $NH_3$. The $NH_3$ flow rate was 320 mL/minute. The furnace setpoint was 1550° C. and furnace temperature was steady. The run was carried out for 62 minutes.

A powder (intermediate reaction product) was collected on a sieve at the exit of the reactor. A mixture of amorphous silica and carbon black was determined to be the result on the basis of infrared spectrophotometry and absence of distinct lines in the x-ray diffraction pattern. The mass ratio of $SiO_2$ to carbon was 1.32:1 as determined by ignition loss and by calculations from carbon lost as byproduct gases, principally HCN and CO.

The intermediate reaction powder was heated to 1460° C. in a stream of dry nitrogen for five hours. The formation of alpha-$Si_3N_4$ was confirmed by x-ray diffraction. A relatively equi-axed, near-micron sized particle morphology was confirmed by scanning electron microscopy.

This example demonstrates that neither the use of seed nor 1450° C. pyrolysis temperature is necessary for the production of alpha-silicon nitride.

EXAMPLE 4

In this example a higher carbon content of the intermediate product (than in Example 3) is obtained by use of nitrogen, not ammonia, as the input gas, but the obtained reaction powder could not be converted to alpha $Si_3N_4$ which points to the criticality of use of $NH_3$ in forming the reaction product.

TEOS was pumped from an air-free enclosure to the entry of an electrically heated tubular reactor and atomized as in Example 1. The droplets so dispersed were swept into a heated reaction zone by a coaxial flow of $N_2$. The $N_2$ flow rate was 470 mL/minute. The furnace setpoint was 1550° C. and furnace temperature was steady. The run was carried out for 64.5 minutes.

A powder was collected on a sieve at the exit of the reactor. When this product was subjected to a nitriding operation, I could not detect the formation of alpha $Si_3N_4$.

EXAMPLE 5

In this example it is shown that a substantially lower temperature (1150° C.) with $N_2$ still does not produce a reaction product which can be converted to alpha silicon nitride.

A seed of amorphous "silicon nitride" (GTE SN-402) was dispersed in TEOS by use of an immersed ultrasonic horn agitation device. The amount of seed was 0.06 g. The amount of TEOS was 156 mL. A dispersant, 2-ethyl 1-hexanol at the 0.5 wt % level based on seed mass. The coarser fraction of the seed was sedimented in 15 h prior to the run.

The TEOS/seed mixture was pumped at a rate of 1.0 mL/min from an air-free enclosure to the entry of an electrically heated tubular reactor and atomized as in Example 1. The droplets so dispersed were swept into a heated reaction zone by a coaxial flow of $N_2$. The $N_2$ flow rate was 940 mL/minute. The furnace setpoint was 1150° C. and furnace temperature was steady. The run was carried out for 119 minutes.

A powder was collected on a sieve at the exit of the reactor. When this product was subjected to a nitriding operation, I could not detect the formation of alpha $Si_3N_4$.

The above examples generally demonstrate the following. Pyrolysis of TEOS under certain demonstrated conditions results in the production of very pure alpha silicon nitride powder which is free from halogen-containing and metal-containing compounds as trace constituents. The pyrolysis should take place in a heated reaction zone in which the temperature is in a range of 1100°–1600° C. Ammonia ($NH_3$) is contacted with the fine mist of TEOS and its decomposition products in the heated reaction zone. Our examples have shown that if nitrogen alone is used, it is not possible to apparently nitride the resulting collected material into the high purity alpha silicon nitride. The reaction product collected from the reaction of ammonia and TEOS should be heated to a temperature in a range of 1300°–1500° C. for the operation in which that collected material is converted to alpha silicon nitride powder of special purity.

While particular examples of the method of my invention have been illustrated and described above, it will be obvious to those skilled in the art that various changes and modifications may be made to my invention without departing from the concepts thereof. It is intended to cover in the appended claims all such modifications and equivalents as fall within the true spirit and scope of this invention.

I claim:

1. A method of making a special purity alpha silicon nitride powder which is particularly free from halogen-containing and metal-containing compounds as trace constituents, which method comprises the steps of:
   preparing a tetraethyl orthosilicate (TEOS) substantially free of halogen and metal purity;
   delivering a fine mist of said TEOS to a heated reaction zone;
   contacting ammonia ($NH_3$) with said fine mist of TEOS in said heated reaction zone;
   collecting said reaction product of said $NH_3$ and TEOS, said reaction product being amorphous silica and carbon black;

heating said reaction product to a temperature in a range of 1300°-1500° C.;

subjecting said heated reaction product to a nitrogen gas treatment to convert said silica of said reaction product into a special purity alpha silicon nitride powder because of the chemical reactions occurring between said silica, carbon black, and nitrogen; and recovering said special purity alpha silicon nitride powder.

2. The method of claim 1, wherein seed crystals of silicon are included in said solution of TEOS when it is prepared.

3. The method of claim 1, wherein an optional hydrocarbon gas is added to the fine mist of TEOS.

4. The method of claim 2, wherein 2-ethyl 1-hexanol is used as a dispersant for said seed in said TEOS.

* * * * *